United States Patent
Lin et al.

(10) Patent No.: US 8,135,810 B2
(45) Date of Patent: Mar. 13, 2012

(54) IPMI SERVER MANAGEMENT SYSTEM AND METHOD

(75) Inventors: Ta-Hua Lin, Taipei (TW); Chung-Nan Chen, Taipei (TW)

(73) Assignee: Inventec Corporation, Taipei (TW)

( * ) Notice: Subject to any disclaimer, the term of this patent is extended or adjusted under 35 U.S.C. 154(b) by 203 days.

(21) Appl. No.: 12/763,220

(22) Filed: Apr. 20, 2010

(65) Prior Publication Data

US 2010/0325256 A1    Dec. 23, 2010

(30) Foreign Application Priority Data

Jun. 18, 2009  (TW) .............................. 98120448 A

(51) Int. Cl.
*G06F 15/173* (2006.01)
*G06F 15/16* (2006.01)

(52) U.S. Cl. ......... 709/220; 709/203; 709/224; 370/401

(58) Field of Classification Search .................. 709/203, 709/220, 224, 228; 370/401
See application file for complete search history.

(56) References Cited

U.S. PATENT DOCUMENTS

| 7,685,281 | B1* | 3/2010 | Saraiya et al. | 709/226 |
| 7,873,693 | B1* | 1/2011 | Mehrotra et al. | 709/203 |
| 7,979,552 | B1* | 7/2011 | Saraiya et al. | 709/226 |
| 2010/0325256 | A1* | 12/2010 | Lin et al. | 709/223 |

FOREIGN PATENT DOCUMENTS

| TW | I273414 | 2/2007 |
| TW | I301939 | 10/2008 |

* cited by examiner

*Primary Examiner* — Khanh Dinh

(74) *Attorney, Agent, or Firm* — CKC & Partners Co., Ltd.

(57) ABSTRACT

An intelligent platform management interface (IPMI) server management system includes a managing side and a plurality of managed sides. The managed sides includes at least on active IPMI managed sides, wherein each of the active IPMI managed side actively provides its service information to the managing side so as to establish a first list, and then the managing side searches out the managed sides which are not on the first list one by one so as to establish a second list. Therefore, the IPMI server management system may effectively sort out the managed sides which are available for application.

11 Claims, 5 Drawing Sheets

ND METHOD

IPMI SERVER MANAGEMENT SYSTEM AND METHOD

RELATED APPLICATIONS

This application claims priority to Taiwan Application Serial Number 98120448, filed Jun. 18, 2009, which is herein incorporated by reference.

BACKGROUND

1. Field of Invention

The present invention relates to a management interface. More particularly, the present invention relates to an intelligent platform management interface (IPMI).

2. Description of Related Art

The IPMI was presented by Intel, Dell, HP and NEC in 1998. An IPMI server management system provides a cross-platform standard interface for monitoring certain conditions of a system, such as temperature, voltage and fan speed, etc., and informs system administrators of the current system conditions by event trigger.

Concretely speaking, the IPMI server management system establishes a sever mechanism among a plurality of managed sides using the IPMI, and builds a resource list when a managing side sends a service request to each of the managed sides, thereby list all of the available managed sides in detail.

However, the process for building the resource list is quite cumbersome and lacks of efficiency. For example, when a network submask address is 192.168.1.255, besides a generic broadcast address 192.168.1.0, the managing side has to send ping signals one by one to a total of 254 server nodes of which the addresses are from 192.168.1.1 to 192.168.1.254, and waits for each of the server nodes to return a pong signal. After receiving the pong signals of the respective server nodes, the managing side asks the available server nodes for their service information.

The aforementioned process is cumbersome and inefficient. Meanwhile, when a managed side at a certain server node is withdrawn from or added to providing service halfway, the managing side will not learn the change until the next round of rescanning the server nodes one by one.

SUMMARY

An aspect of the present invention is to provide an IPMI server management system for speeding up the establishment of resource list.

According to an embodiment, the IPMI server management system includes a managing side and a plurality of managed sides. The managed sides include at least one active IPMI managed side, wherein each of the at least one active IPMI managed side actively provides its service information to the managing side so as to establish a first list, and then the managing side searches out the managed sides which are not on the first list one by one so as to establish a second list. Therefore, the IPMI server management system can effectively sort out a plurality of managed sides which are available for application.

Another aspect of the present invention is to provide an IPMI server management method for promoting the efficiency of the IPMI.

According to an embodiment, the IPMI server management method includes the following steps. At least one active IPMI managed side is controlled to provide at least one set of service information to a managed side, and a first list is built at the managing side in accordance with the service information. Then, the managing side is controlled to search out a plurality of managed sides which are not included in the first list, so as to establish a second list. Therefore, the IPMI server management method can list the available managed sides in the first list shortly.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
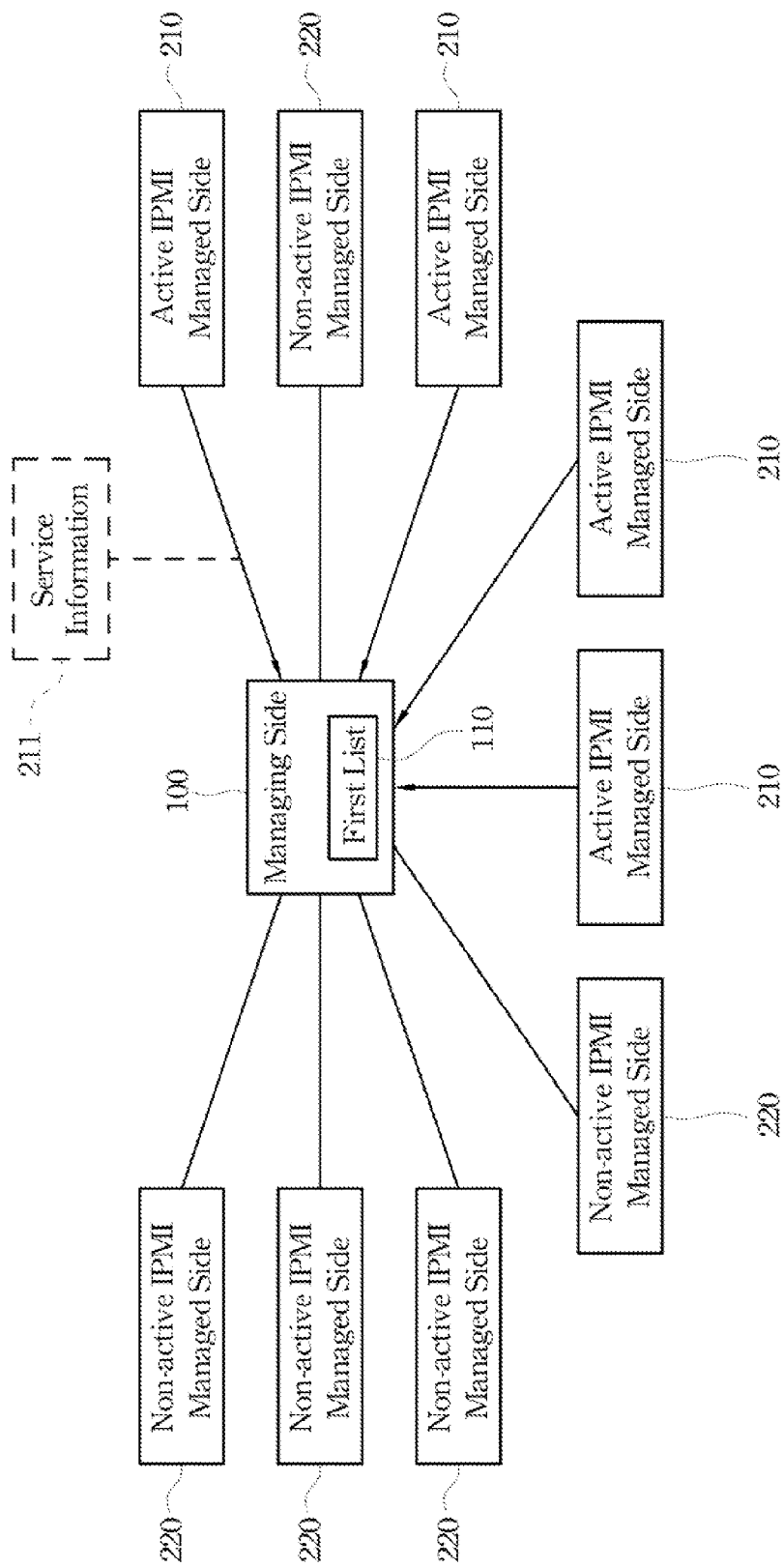
FIG. 1 is a functional block diagram showing an IPMI server management system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a functional block diagram showing an IPMI server management system according to an embodiment of the present invention. In FIG. 1, the IPMI server management system of this embodiment includes a managing side 100 and a plurality of managed sides. The managed sides 210 can be further divided into a plurality of active IPMI managed sides 210 and a plurality of non-active IPMI managed sides 220. Each of the active IPMI managed sides 210 first provides service information 211 actively to the managing side 100 for establishing a first list 110, so that a user at the managing side 100 may perform operation onto a plurality of active IPMI managed sides 210 which have first returned responses to the managing side 100 actively, and does not need to wait until all of the server nodes have returned responses, thus promoting the operation efficiency of the IPMI server management system.

Figure 2:
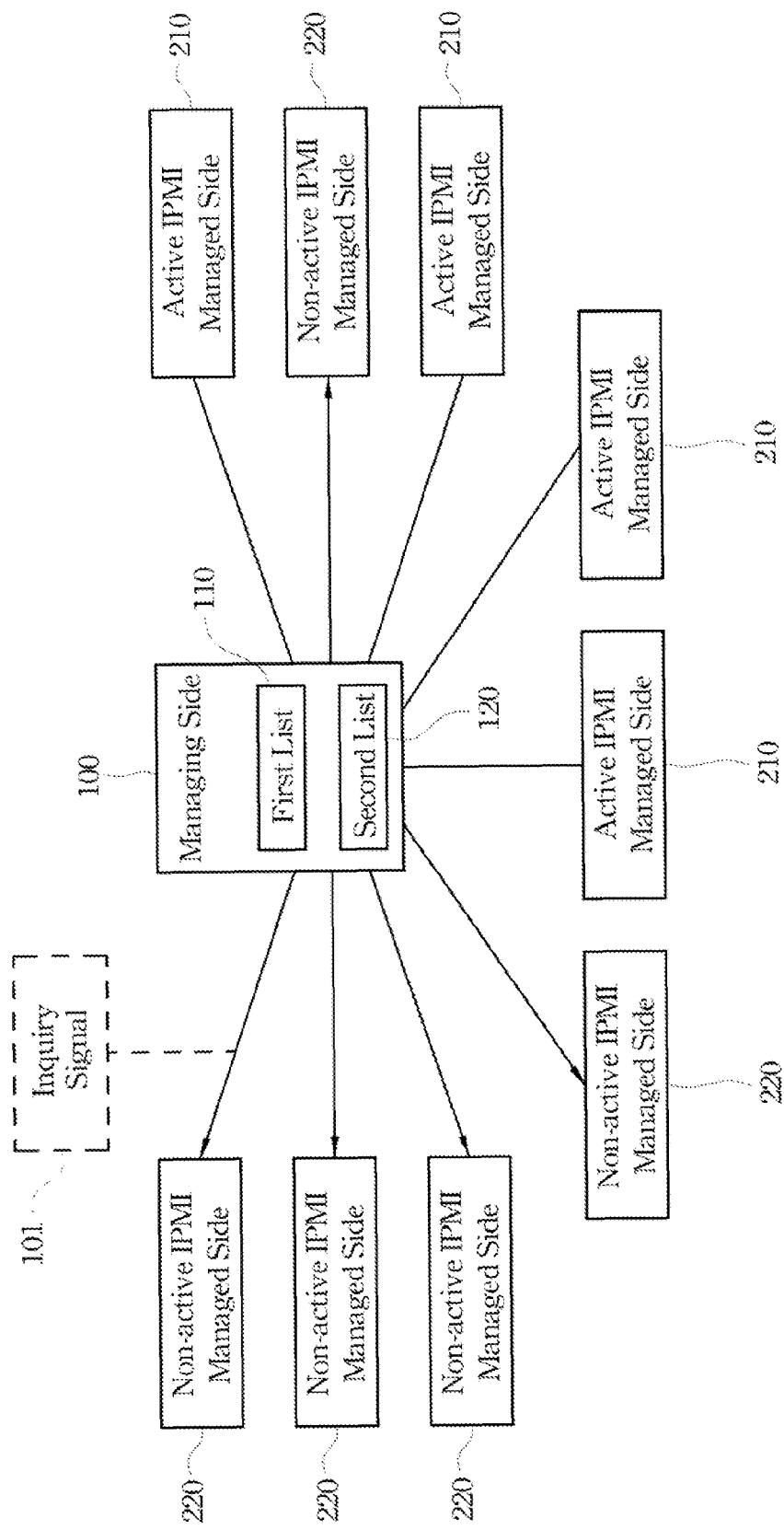
FIG. 2 is a functional block diagram for explaining a method for building a second list by the IPMI server management system of FIG. 1.

Subsequently, referring to FIG. 2, FIG. 2 is a functional block diagram for explaining a method for building a second list 120 by the IPMI server management system of FIG. 1. While the user at the managing side 100 is performing operation, the managing side 100 also sends an inquiry signal 101 to each of the nodes which have not ever returned responses actively, thereby confirming if there exist tangible managed sides at the node addresses. Thereafter, the managing side 100 further requests these managed sides to return their respective service information, thereby establishing a second list 120. Then, the managing side 100 provides the second list 120 to the user for continuing the user's operation.

In view of the forgoing, the IPMI server management system of this embodiment can greatly reduce the time for waiting a plurality of managed sides (such as various servers or signal sensors) to return responses while the user is performing operation at the managing side 100, thus promoting the operation efficiency of the IPMI server management system. Concretely speaking, the managing side 100 first performs broadcast via an address protocol (ARP) to confirm if tangible managed sides at the node addresses exist at the respective server nodes, and then requests each of the managed sides to return its available service information to establish the second list 120. Hence, the service information 211 actively returned by each of the active IPMI managed sides 210 include its address message, which is advantageous to establishing the first list 110.

Figure 3:
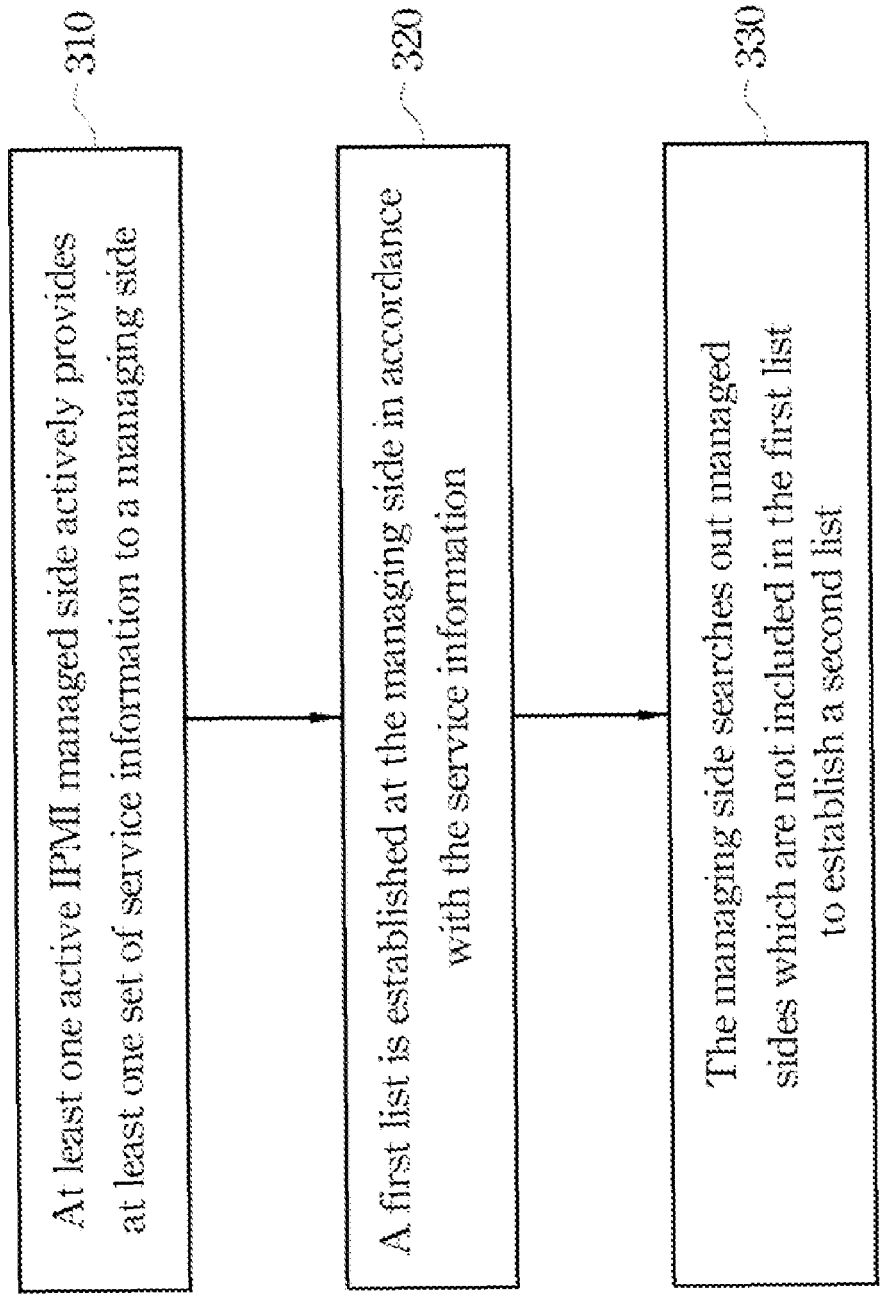
FIG. 3 is a flow chart showing an IPMI server management method according to an embodiment of the present invention.

Referring to FIG. 3, FIG. 3 is a flow chart showing an IPMI server management method according to an embodiment of the present invention. The IPMI server management method includes the following steps. At first, in step 310, at least one active IPMI managed side actively provides at least one set of service information to a managing side. Then, in step 320, a first list is established at the managing side in accordance with the aforementioned service information, and the first list is provided to a user for performing operation. Thereafter, in step 330, the managing side searches out a plurality of managed sides which are not included in the first list, so as to establish a second list, and then provided the second list to the user. Therefore, the IPMI server management method can list the available managed sides in the first list shortly, thus effectively sorting out a plurality of managed sides which are available for application.

It is noted that, whenever a new active IPMI managed side is added to the server nodes, the newly added active IPMI managed side also will send new service information for updating the first list. Further, in this embodiment, the active IPMI managed sides can be set to update their respective service information in every predetermined period of time, and thus, when an active IPMI managed side is withdrawn from providing service halfway, the change can be reflected on the first list timely. Alternatively, in this embodiment, the active IPMI managed sides also can be set to actively issue an empty signal when withdrawing from the server nodes, so as to notify the managing side to update the first list timely. Therefore, the related variations are all within the scope of this embodiment.

In view of the forgoing, in this embodiment, the managing side also may issue inquiry signals in every predetermined period of time to confirm the managed sides (i.e. non-active IPMI managed sides) which are not included in the first list one by one, thereby updating the second list timely.

Further, this embodiment also may optionally merge the first list with the second list for displaying them to the user simultaneously; or separately displays those two lists. For the sake of completeness, the managing side of this embodiment also may issue inquiry signals to the active IPMI managed sides at an idle period after obtaining the first list and the second list, thereby confirming if the first list is correct.

Figure 4A:
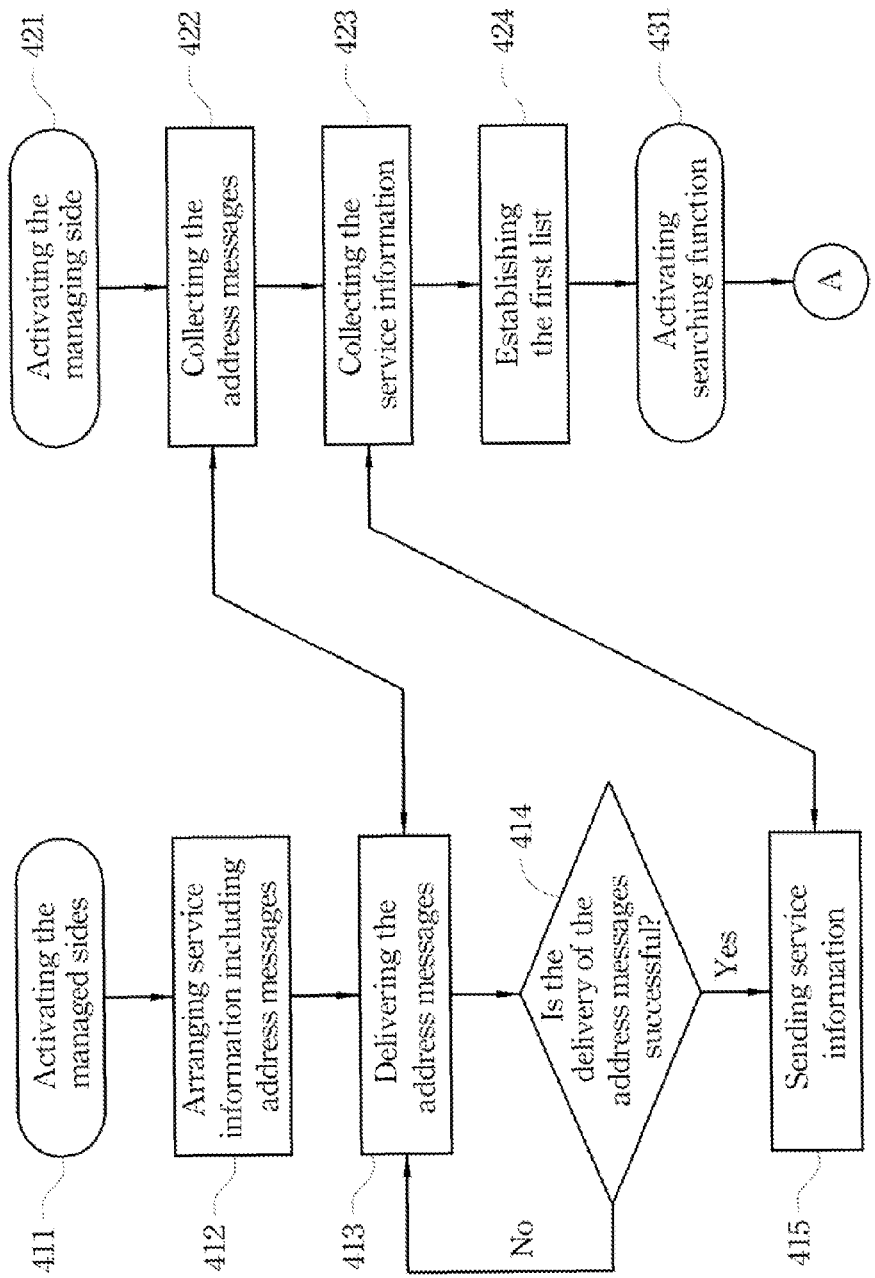
FIG. 4(a) and FIG. 4(b) depict a flow chart showing the detailed steps of the IPMI server management method shown in FIG. 3.
Figure 4B:
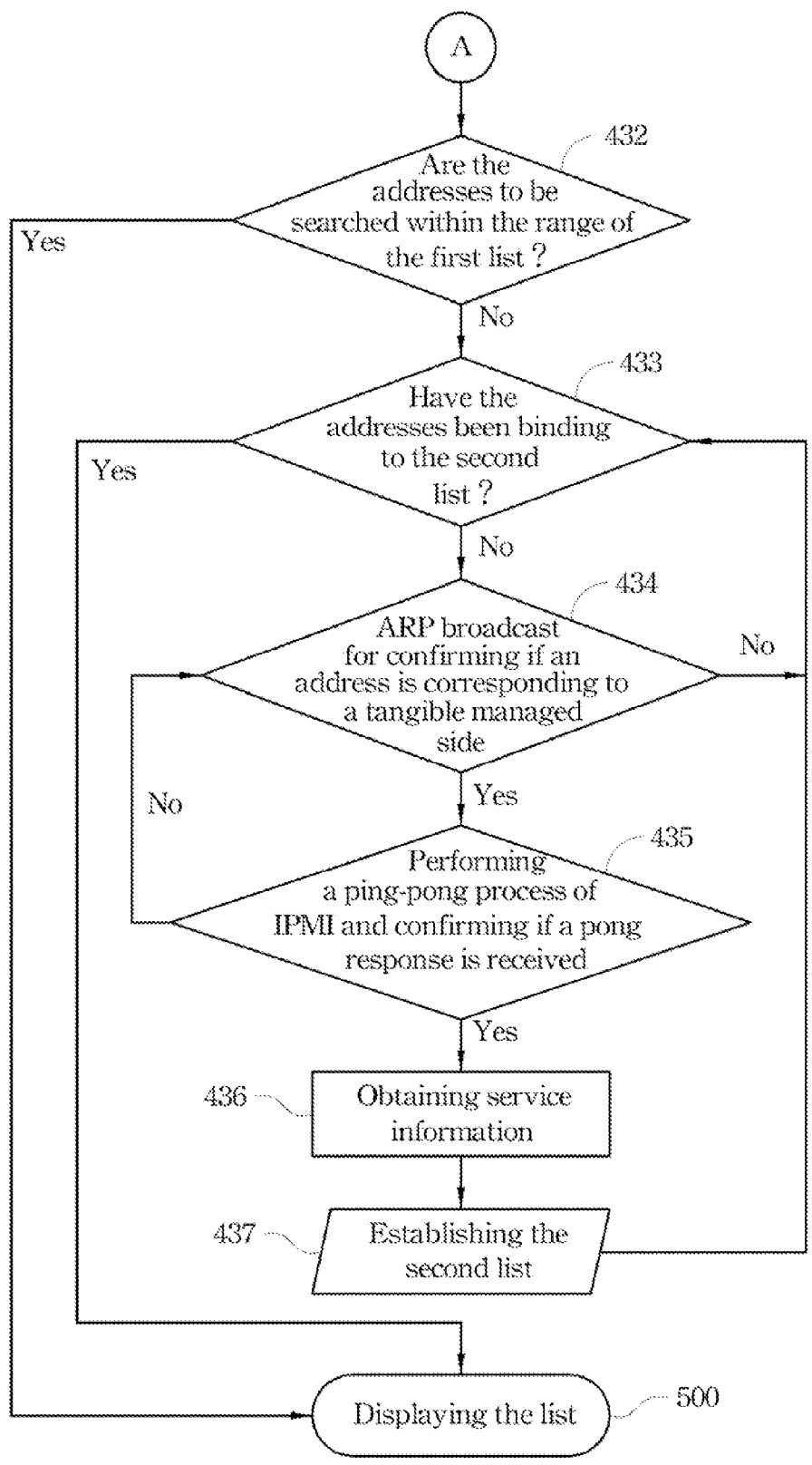

Referring to FIG. 4(*a*) and FIG. 4(*b*), FIG. 4(*a*) and FIG. 4(*b*) depict a flow chart showing the detailed steps of the IPMI server management method shown in FIG. 3. This embodiment first confirms if a plurality of network addresses are binding to the respective tangible managed sides, and then obtains the service information of the respective tangible managed sides. At first, step 411 is performed to activate the managed sides, and step 421 is performed to activate the managing side. Then step 412 is performed to arrange their service information including address messages, wherein the service information further includes notification time setting data. The notification time setting data define a predetermined period of time, wherein the active IPMI managed sides will actively issue notification packets to the managing side in very predetermined period of time; a waiting period of time, wherein the active IPMI managed sides will wait the waiting period of time to issue notification packets again to the managing side, when having not received return packets from the managing side for a certain period of time after first issuing the notification packets to the managing side; and a number of times of the notification packets issued when the active IPMI managed sides do not receive return packets from the managing side. Thereafter, step 413 is performed to deliver the address messages, and step 414 is performed to confirm if the delivery of the address messages is successful. When the result of step 414 is yes, it means to the managing side that a certain address has been successfully binding to a tangible active IPMI managed side. Meanwhile, in step 422, the managing side starts collecting the address messages actively returned after being activated, meaning that there are tangible managed sides existing on those network addresses.

Thereafter, in steps 415 and 423, the active IPMI managed sides send their service information, and the managing side collects the service information. Then, in step 424, the managing side establishes the first list, and the first list has included a few of network addresses and their corresponding service information.

Then, step 431 is performed to activate searching function at the managing side for learning at what addresses the tangible managed sides still exist, and inquire of each tangible managed side about its service information.

It is noted that, in step 432, the managing side first excludes the addresses listed in the first list from the addresses to be searched. In other words, the managing side first checks if the addresses to be searched are within the range of the first list. If the result is yes, step 500 is performed to display the list, since the addresses to be searched have existed in the first list, and the managing side does not need to waste time and effort for searching them. If the result is no, in step 433, the managing side further checks if these addresses have been binding to the second list generated in the previous operation. If a certain address has existed in the second list, step 500 is performed and the certain address does not need to be checked again.

Thereafter, if an address does not exist in the first list or the second list, step 434 is performed to perform an ARP broadcast for confirming if the address is corresponding to a tangible managed side. If the address is an empty address, this embodiment returns to step 433 to search for a next address which does not exist in the first list and the second list, thereby checking the next address.

If there is a tangible managed side actually existing at the address mentioned in step 434, step 435 is performed to perform a ping-pong process of IPMI. When the tangible managed side at the address smoothly produces a pong response, step 436 is performed to obtain the service information of the tangible managed side, and step 437 is performed to add its address and service information to the second list.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An intelligent platform management interface (IPMI) server management system, comprising:

a managing side; and a plurality of managed sides comprising at least one active IPMI managed side, wherein each of the at least one active IPMI managed side actively provides its service information to the managing side so as to establish a first list, and then the managing side searches out the managed sides which are not on the first list one by one so as to establish a second list.

2. The IPMI server management system as claimed in claim 1, wherein the managed side is a server.

3. The IPMI server management system as claimed in claim 1, wherein the managed side is a sensor.

4. The IPMI server management system as claimed in claim 1, wherein the service information comprises an address message.

5. An IPMI server management method, comprising:
actively providing service information to a managing side by each of at least one active IPMI managed side;
establishing a first list at the managing side in accordance with the service information; and
searching out a plurality of managed sides which are not on the first list one by one via the managing side, thereby establishing a second list.

6. The IPMI server management method as claimed in claim 5, further comprising:
updating the service information provided to the managing side in every predetermined period of time by the active IPMI managed side, thereby updating the first list.

7. The IPMI server management method as claimed in claim 5, further comprising:
re-searching out the managed sides which are not on the first list one by one in every predetermined period of time via the managing side, thereby updating the second list.

8. The IPMI server management method as claimed in claim 5, further comprising:
merging the first list with the second list.

9. The IPMI server management method as claimed in claim 5, further comprising:
confirming the active IPMI managed side after the second list is established at the managing side, thereby confirming the first list.

10. The IPMI server management method as claimed in claim 5, further comprising:
actively issuing a signal to update the first list when the IPMI managed side is not managed by the managing side anymore.

11. An IPMI server management method, comprising:
actively providing service information to a managing side by each of at least one active IPMI managed side;
establishing a first list at the managing side in accordance with the service information;
updating the service information provided to the managing side in every predetermined period of time by the active IPMI managed side, thereby updating the first list;
actively issuing a signal to update the first list when the IPMI managed side is not managed by the managing side anymore;
searching out a plurality of managed sides which are not on the first list one by one via the managing side, thereby establishing a second list;
confirming the active IPMI managed side after the second list is established at the managing side, thereby confirming the first list
re-searching out the managed sides which are not on the first list one by one in every predetermined period of time via the managing side, thereby updating the second list; and
merging the first list with the second list.

* * * * *